Feb. 19, 1924.
J. F. BRECKENRIDGE
POULTRY PERCH AND LICE TRAP
Filed Feb. 12, 1923
1,484,169
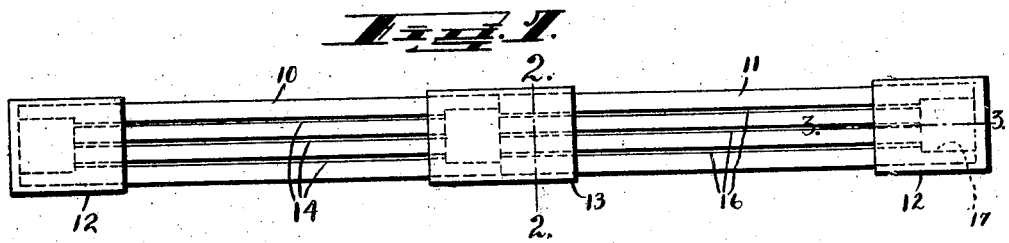
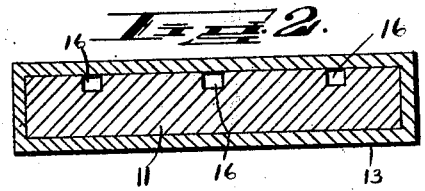
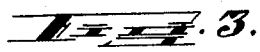
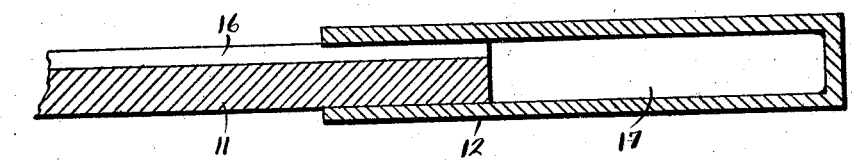
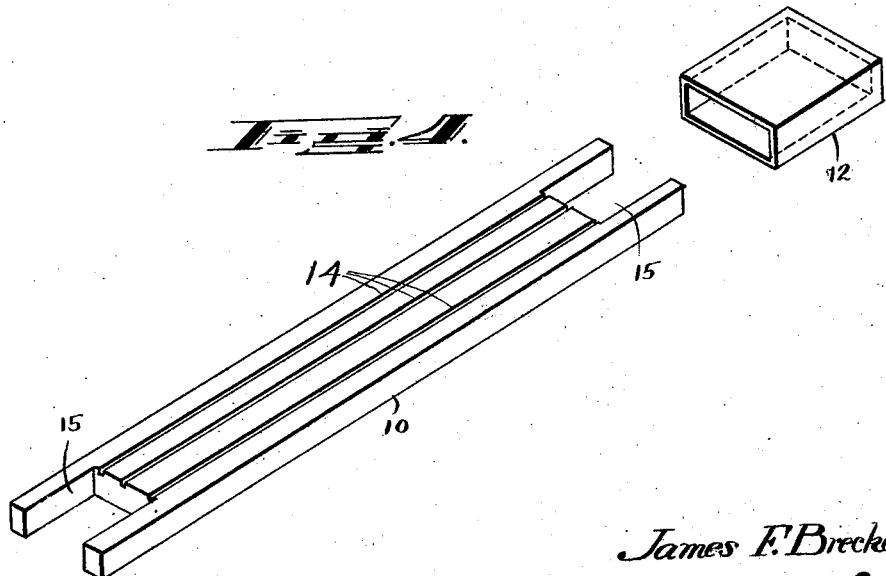
James F. Breckenridge, INVENTOR
BY Victor J. Evans, ATTORNEY
WITNESS:

Patented Feb. 19, 1924.

1,484,169

UNITED STATES PATENT OFFICE.

JAMES F. BRECKENRIDGE, OF ENGLEWOOD, NEW JERSEY, ASSIGNOR OF ONE-HALF TO FRANK E. BRETT, OF NEW YORK, N. Y.

POULTRY PERCH AND LICE TRAP.

Application filed February 12, 1923. Serial No. 618,648.

*To all whom it may concern:*

Be it known that I, JAMES F. BRECKENRIDGE, a citizen of the United States, residing at Englewood, in the county of Bergen and State of New Jersey, have invented new and useful Improvements in Poultry Perches and Lice Traps, of which the following is a specification.

This invention relates to poultry roosts or perches and traps therefor.

Some of the objects of the present invention are: to produce a simple, inexpensive means to be set up for use upon which poultry may roost and with which the vermin or lice which infest the poultry may be trapped in such a manner as to prevent their escape to again infest the poultry; to produce a poultry perch and poultry lice trap of readily separable parts so that the same may be taken apart for the removal and killing of the lice and the cleaning of the parts as may be required; and with these and other objects in view the invention resides in the particular provision, relative disposition and the construction of parts hereinafter fully described and illustrated in the accompanying drawing, in which:

Figure 1 is a plan view of a poultry perch and poultry lice trap constructed in accordance with the present invention.

Figure 2 is an enlarged transverse sectional view taken on the line 2—2, Figure 1.

Figure 3 is a sectional view taken on the line 3—3, Figure 1.

Figure 4 is a perspective view of one of the parts of the perch and its trap-member removed.

Referring now more particularly to the several views of the drawing, it will be apparent that, the perch and trap of the present invention, generally, comprise parts 10, 11, 12, 12, and 13. The parts 10 and 11 are preferably made of wood and are substantially equal in length. The part 10 has grooves 14 on one side thereof, and the opposite ends of the same are cut out as at 15. The part 11 has grooves 16 in one side thereof similar to the grooves 14, and one end of the part 11 is cut-out as at 17. The parts 12, 12 are to be known as trap-members. The trap-members 12, 12 are identical in construction each being made preferably of metal and being hollow to fit over one end of one of the parts 10 and 11. Portions of each trap-member 12, 12, serve with portions of the part 10 or 11 to which they are fitted and by virtue of the cut-outs therein, to form recesses to which the grooves in the respective part lead. The part 13 is also in the nature of a trap-member, and is preferably made of metal. The part 13 serves for receiving ends of the parts 10 and 11 to hold them together with the extremities of the parts 10 and 11 abutting each other. Portions of the trap-members 13 serve with portions of the parts 10 and 11 at the cut-out 15 in the part 10 to form a recess to which the grooves 14 and 16 in the parts 10 and 11 lead.

From the foregoing it will be manifest that, the perch and trap of the present invention, contemplates the use of readily separable parts, and that by reason of the parts being separable the same may be cleaned of the lice trapped to be killed to the utmost satisfaction.

A very important feature of the present invention preventing or overcoming the return of the lice to the fowl is the use of a liquid substance with which the parts 10 and 11 are saturated. The substance in fact is a bait and something on which the lice can thrive and they therefore do not return to the fowl.

What is claimed is:

1. For trapping poultry lice, a perch of a plurality of parts each of which has grooves therein, a trap-member for holding the parts together with ends thereof abutting each other, and portions of said parts serving with portions of said trap-member to form a recess to which said grooves lead.

2. For trapping poultry lice, a wooden perch of a plurality of parts each of which has grooves therein, a metallic trap-member for holding the parts together with ends thereof abutting each other, and portions of said parts serving with portions of said trap-member to form a recess to which said grooves lead.

3. For trapping poultry lice, a perch of a plurality of parts each of which has grooves therein, a trap-member which holds said parts together with ends thereof abutting each other, portions of said parts serving with portions of said trap-member to form a recess to which said grooves lead, and a trap-member carried by the free end of each of said parts each of which ends has portions which serve with portions of its related trap-member to form a recess to which said grooves lead.

In testimony whereof I hereby affix my signature.

JAMES F. BRECKENRIDGE.